No. 879,047. PATENTED FEB. 11, 1908.
H. & A. HEUBNER.
ADJUSTABLE SUPPORTING STICK FOR PLANTS.
APPLICATION FILED APR. 30, 1907.
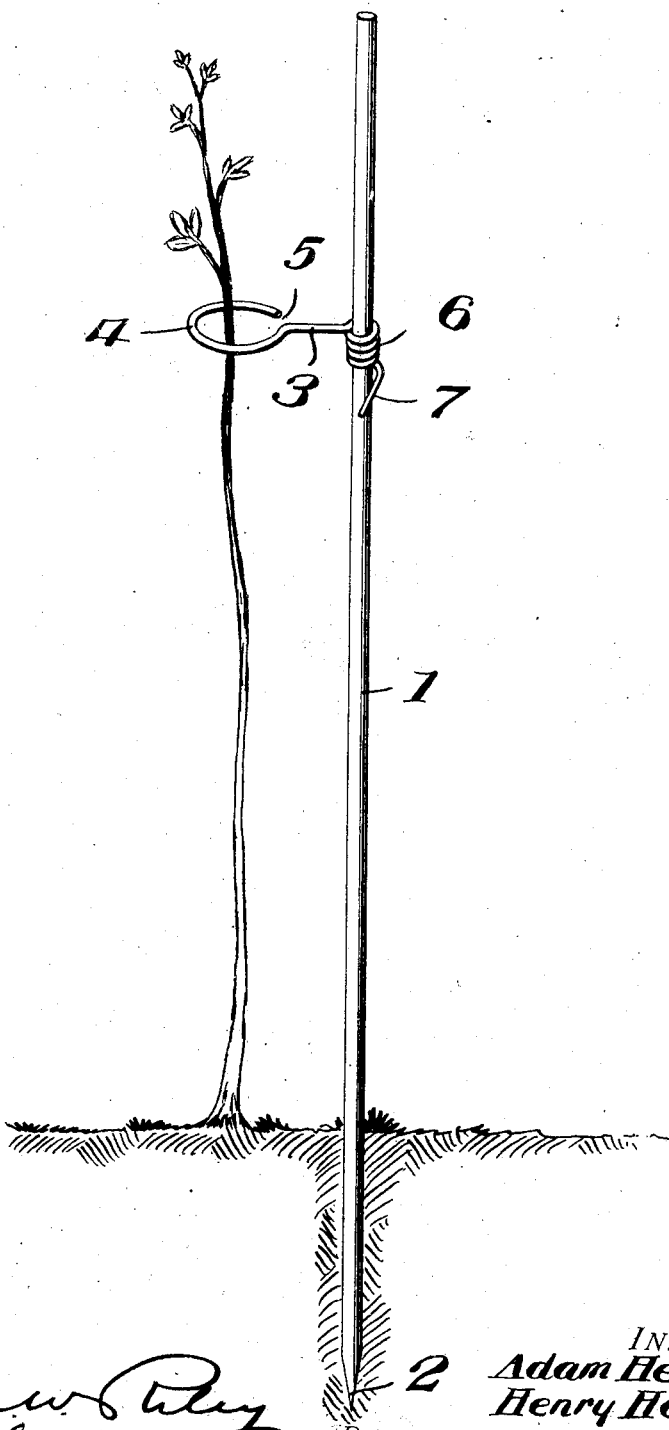
WITNESSES:
INVENTORS
Adam Heubner
Henry Heubner
By
W. J. FitzGerald & Co.
Attorneys

UNITED STATES PATENT OFFICE.

HENRY HEUBNER AND ADAM HEUBNER, OF BROOKLYN, NEW YORK.

ADJUSTABLE SUPPORTING-STICK FOR PLANTS.

No. 879,047.	Specification of Letters Patent.	Patented Feb. 11, 1908.

Application filed April 30, 1907. Serial No. 371,156.

*To all whom it may concern:*

Be it known that we, HENRY HEUBNER and ADAM HEUBNER, citizens of the United States, residing at Brooklyn, in the county of Kings and State of New York, have invented certain new and useful Improvements in Adjustable Supporting-Sticks for Plants; and they do hereby declare the following to be a full, clear, and exact description of the invention, such as will enable others skilled in the art to which it appertains to make and use the same.

Our invention relates to adjustable supporting sticks for plants, and our object is to provide a non-destructible stick whereby the same may be used from year to year.

A further object is to provide an adjustable means for engaging and holding the plant.

Other objects and advantages will be hereinafter referred to and more particularly pointed out in the claims.

In the accompanying drawing which is made a part of this application, the figure is a perspective view of the plant stick complete, showing the same applied to use.

Referring to the drawing, in which similar reference numerals designate corresponding parts, 1 indicates a stick, which is preferably constructed of metal, and provided with a point 2 at one end, so that the same may be readily inserted in the ground.

In order to hold the plant in an upright position while the same is growing, we secure to the stick 1 a holder 3, the outer end of which is formed into a loop 4, which is adapted to surround the growing plant, and in order to readily engage the loop with the plant, a space 5 is left between the free end of the loop and the body of the holder, so that the plant may be inserted into the loop by entering the same through the space.

The opposite end of the holder 3 is adjustably secured to the stick 1, by forming a portion of the holder into a socket 6, which is accomplished by twisting a portion of the holder around the stick, and in order to positively hold the holder in its adjusted position, the free end of that portion of the holder forming the socket is so arranged as to form a spring finger 7, which extends downwardly from the socket 6, and into engagement with the surface of the stick, so that the pressure of the free end of the finger on the stick will cant the socket and cause the same to bind on the stick, which together with the pressure of the finger on the stick will positively hold the holder in its adjusted position.

In operation the stick is entered into the earth's surface adjacent the plant, and the holder moved downwardly on the stick until the plant can be engaged with the loop 4, and as the plant grows, the holder is gradually moved upwardly on the stick thereby keeping the holder adjacent the upper end of the plant, which will result in holding the plant in a vertical position until such time as the plant has reached the stage of growth to be self-supporting, when, if desired, the holding stick may be entirely removed.

It will thus be seen that we have provided a very cheap and economical form of support for plants, and one that will last indefinitely, and it will further be seen that the holding device for the plant may be adjusted from time to time to keep pace with the growth of the plant.

What I claim is:

The herein described supporter for plants comprising the combination with a stick having a point at the lower end thereof, of a holder on said stick, said holder being formed from one section of material, a loop formed at one end of said holder by bending the material in circular form, a space being left between the free end of the loop and the body of the holder through which a plant is adapted to be introduced into the loop, a socket at the opposite end of the body portion of the holder formed by twisting a portion of the holder around the stick and a finger formed at the lower end of said socket by extending the free end of the holder downwardly and at a tangent to the axial plane of the stick whereby pressure will be directed against the stick and the socket canted on the stick.

In testimony whereof we have signed our names to this specification in the presence of two subscribing witnesses.

HENRY HEUBNER.
ADAM HEUBNER.

Witnesses:
JOHN TREIBER,
FRANK BENNER.